US007974664B2

(12) United States Patent
Liu et al.

(10) Patent No.: US 7,974,664 B2
(45) Date of Patent: Jul. 5, 2011

(54) BLUETOOTH EARPHONE AND EAR-HOOK DEVICE THEREOF

(75) Inventors: Chun-Hsin Liu, Taipei (TW); Chung-Chun Wu, Taipei (TW); Yu-Chang Hung, Taipei (TW)

(73) Assignee: Lite-On Technology Corp., Taipei (TW)

( * ) Notice: Subject to any disclaimer, the term of this patent is extended or adjusted under 35 U.S.C. 154(b) by 663 days.

(21) Appl. No.: 11/798,301

(22) Filed: May 11, 2007

(65) Prior Publication Data

US 2008/0188179 A1 Aug. 7, 2008

(30) Foreign Application Priority Data

Feb. 1, 2007 (TW) ............................... 96201967 U

(51) Int. Cl.
*H04M 1/00* (2006.01)

(52) U.S. Cl. ................... 455/575.2; 455/575.1; 379/430

(58) Field of Classification Search ............... 455/575.1, 455/575.2; 379/430
See application file for complete search history.

(56) References Cited

U.S. PATENT DOCUMENTS

| | | | | |
|---|---|---|---|---|
| 5,450,496 | A * | 9/1995 | Burris et al. | 381/375 |
| 6,810,987 | B1 * | 11/2004 | DeKalb | 181/129 |
| 7,130,419 | B2 * | 10/2006 | Bodley et al. | 379/430 |
| 7,292,823 | B2 * | 11/2007 | Kuo | 455/41.2 |
| 7,577,465 | B2 * | 8/2009 | Cheng et al. | 455/575.2 |
| 7,620,173 | B1 * | 11/2009 | Wilson | 379/430 |
| 2005/0124391 | A1 * | 6/2005 | Lee et al. | 455/575.1 |
| 2006/0135223 | A1 * | 6/2006 | Kim | 455/575.2 |
| 2006/0147078 | A1 * | 7/2006 | Neu et al. | 381/374 |
| 2008/0070651 | A1 * | 3/2008 | Ong et al. | 455/575.4 |

* cited by examiner

*Primary Examiner* — Lester Kincaid
*Assistant Examiner* — Isaak Jama
(74) *Attorney, Agent, or Firm* — Bacon & Thomas, PLLC

(57) ABSTRACT

A Bluetooth earphone and an ear-hook device thereof are provided. The Bluetooth earphone includes an earphone body and an ear-hook device. The ear-hook device includes a hinge assembly and an ear hook. The hinge assembly is rotatably disposed on the earphone body. The ear hook is rotatably disposed on the hinge assembly. As a result, the ear hook is able to rotate around the earphone body on two different axes via the hinge assembly, such that a user can selectively wear the Bluetooth earphone on his or her left ear or right ear.

12 Claims, 3 Drawing Sheets

BLUETOOTH EARPHONE AND EAR-HOOK DEVICE THEREOF

This application claims the benefit of Taiwan application Serial No. 96201967, filed Feb. 1, 2007, the subject matter of which is incorporated herein by reference.

BACKGROUND OF THE INVENTION

1. Field of the Invention

The invention relates in general to a Bluetooth earphone and an ear-hook device thereof, and more particularly to a Bluetooth earphone which can be selectively worn on the right ear or the left ear and an ear-hook device thereof.

2. Description of the Related Art

With the rapid development of wireless communication technology, it has been widely implemented in many electronic products that people use in their everyday lives. As a result, the requirement of setting up transmission cables does not exist anymore. Examples of wireless transmission technology include infrared ray, radio frequency identification and Bluetooth technologies. The uses of wireless communication technology are determined according to the needs of various electronic products.

Currently, Bluetooth technology has been widely used in mobile phone as a solution to wireless communication. Bluetooth earphone that goes with mobile phone is a hand-free headset that can be worn on a user's ear. Therefore it allows the user to answer the call without holding the mobile phone. The comfort of wearing the earphone is also important to the user. Furthermore, when choosing a Bluetooth earphone, the user considers not only the appearance of the Bluetooth earphone but also the operational functions of the Bluetooth earphone. A Bluetooth earphone is different from an earphone that goes with a CD walkman or a MP3 player because the Bluetooth earphone is monaural and only worn on the user's left ear or right ear. Therefore, the Bluetooth earphone capable of being selectively worn on the user's left ear or right ear is indeed a practical product.

SUMMARY OF THE INVENTION

The invention is directed to a Bluetooth earphone and an ear-hook device thereof. The ear-hook device of the Bluetooth earphone functions to rotate on two axes, such that a user can selectively wear the Bluetooth earphone on his or her left ear or right ear. The ear-hook device is easy to assemble and easy to operate.

According to a first aspect of the present invention, an ear-hook device disposed in a Bluetooth earphone is provided. The ear-hook device includes a hinge assembly and an ear hook. The hinge assembly is rotatably disposed on the Bluetooth earphone. The ear hook is rotatably disposed on the hinge assembly. As a result, the ear hook is able to rotate around the earphone body on two different axes via the hinge assembly, such that a user can selectively wear the Bluetooth earphone on his or her left ear or right ear.

According to a second aspect of the present invention, a Bluetooth earphone including an earphone body and an ear-hook device is provided. The ear-hook device includes a hinge assembly and an ear hook. The hinge assembly is rotatably disposed on the earphone body. The ear hook is rotatably disposed on the hinge assembly. As a result, the ear hook is able to rotate around the earphone body on two different axes via the hinge assembly, such that a user can selectively wear the Bluetooth earphone on his or her left ear or right ear.

The invention will become apparent from the following detailed description of the preferred but non-limiting embodiments. The following description is made with reference to the accompanying drawings.

DETAILED DESCRIPTION OF THE INVENTION

Figure 1:
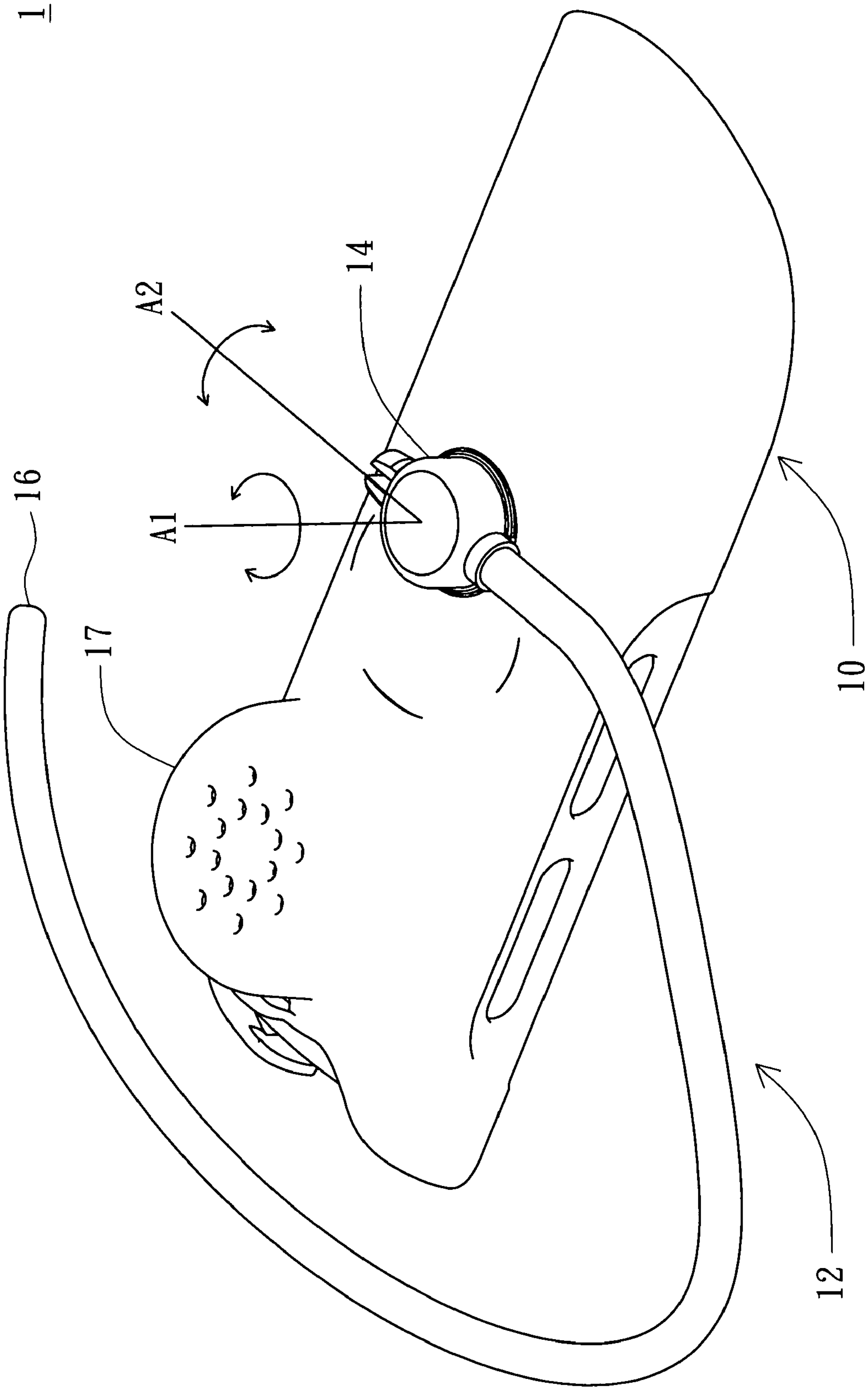
FIG. 1 is a 3-D perspective of a Bluetooth earphone according to a preferred embodiment of the invention.

Referring to FIG. 1, a 3-D perspective of a Bluetooth earphone according to a preferred embodiment of the invention is shown. As indicated in FIG. 1, the Bluetooth earphone 1 includes an earphone body 10 and an ear-hook device 12. The ear-hook device 12 includes a hinge assembly 14 and an ear hook 16. The hinge assembly 14 is rotatably disposed on the earphone body 10. The ear hook 16 is rotatably disposed on the hinge assembly 14. As a result, the ear hook 16 is able to rotate with respect to a first axis A1 and a second axis A2 via the hinge assembly 14, such that a user can selectively wear the Bluetooth earphone 1 on his or her left ear or right ear.

The earphone body 10 further includes an earbud portion 17 for transmitting the sound to the user's ear. The ear hook 16 of the Bluetooth earphone 1 is a curved hook for example.

Figure 2:
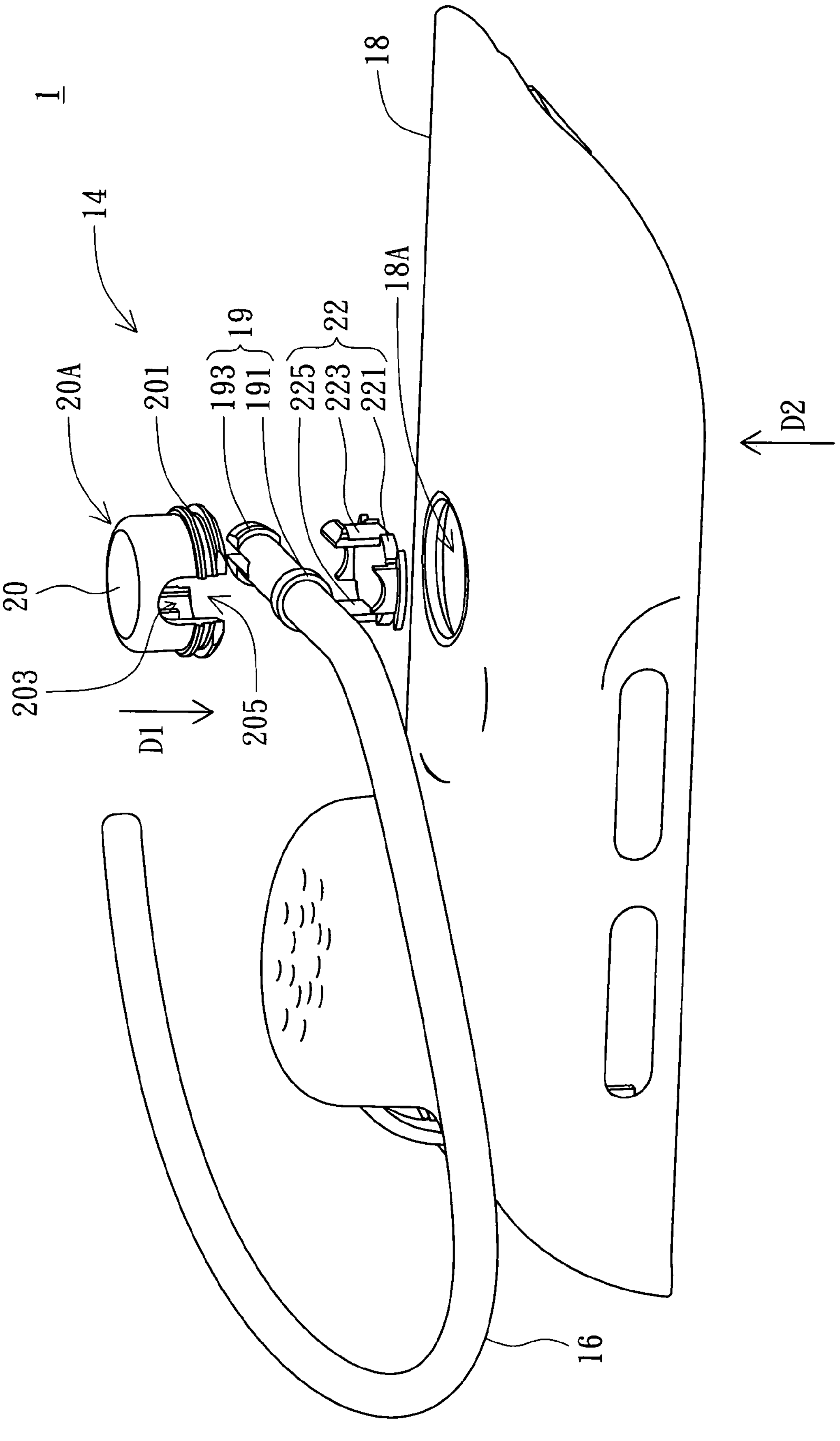
FIG. 2 is an exploded diagram of the Bluetooth earphone of FIG. 1.

Referring to FIG. 2, an exploded diagram of the Bluetooth earphone of FIG. 1 is shown. As indicated in FIG. 2, the casing 18 of the earphone body 10 has a through hole 18A. The hinge assembly 14 includes a bracket 20 and a hinge cover 22. The bracket 20 passes through the through hole 18A of the casing 18. Preferably, a track 201 disposed on the outer surface 20A of the bracket 20 is coupled with the casing 18 for enabling the bracket 20 to rotate on the casing 18. The bracket 20 further has two open slots 203 (only one open slot is illustrated due to the restriction of view angle). The ear hook 16 passes through the open slots 203. A clamping portion 19 positioned at one end of the ear hook 16 is for coupling with the bracket 20 via the open slot 203. The clamping portion 19 includes a flange 191 and a fastener 193 respectively against the outer surface 20A of the bracket 20 for fixing the ear hook 16 on the bracket 20. The bracket 20 is round-shaped for example. The bracket 20 has an opening 205, and the outer surface 20A of the bracket 20 surrounds the opening 205. The hinge cover 22 of the hinge assembly 14 is disposed in the opening 205. When one end of the ear hook 16 is received in the bracket 20, the hinge cover 22 covers portion of the ear hook 16 in the bracket 20; meanwhile, as the hinge cover 22 is coupled with the bracket 20, the hinge assembly 14 and the casing 18 form a firmer structure.

Figure 3:
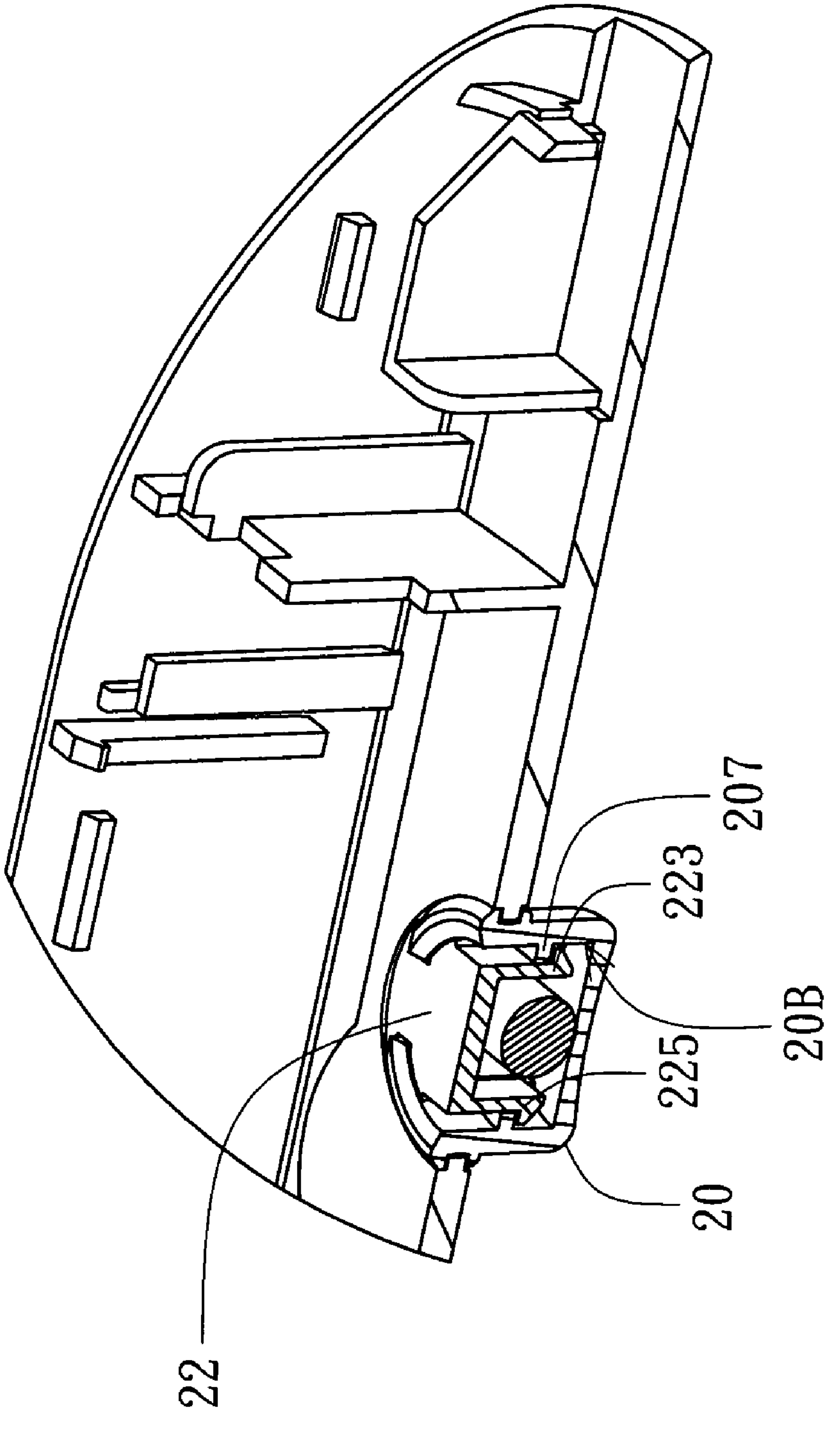
FIG. 3 is a partial cross-sectional view of the Bluetooth earphone of FIG. 1.

The designs of the bracket 20 and the hinge cover 22 are further elaborated in FIG. 2 and FIG. 3. FIG. 3 is a partial cross-sectional view of the Bluetooth earphone of FIG. 1. As indicated in FIG. 2, the hinge cover 22 includes a covering plate 221 and two hooks 223 and 225, wherein the covering plate 221 is for covering the opening 205 of the bracket 20, and the hooks 223 and 225 are for fixing the hinge cover 22 on the bracket 20. As indicated in FIG. 3, a protrusion 207 is disposed on the inner surface 20B of the bracket 20. The two hooks 223 and 225 retain the protrusion 207 for fixing the hinge cover 22 on the bracket 20.

The assembly of the Bluetooth earphone 1 is elaborated below. Firstly, the bracket 20 is assembled in the casing 18. As indicated in FIG. 2, preferably, the bracket 20 passes through the casing 18 along the first direction D1 such that the shell of the casing 18 is embedded into the track 201. Thus, the bracket 20 is coupled with the casing 18 and the bracket 20 is able to rotate with respect to the casing 18. Next, After one end of the clamping portion 19 passes through the open slot 203 of the bracket 20, and the fastener 193 of the clamping portion 19 passes through another open slot (not shown), two sides of the bracket 20 are retained by the flange 191 and the fastener 193. The assembly of the ear hook 16 is completed here. Then, the hinge cover 22 is assembled along the second direction D2. During the process of the assembly, because the elasticity of the hooks 223 and 225 and the bracket 20, the hooks 223 and 225 of the hinge cover 22 are capable of squeezing with the protrusion 207 inside the bracket 20. After the hooks 223 and 225 move for a short course, the hooks 223 and 225 can couple with the protrusion 207 as indicated in FIG. 3.

With the functions of the hinge assembly 14 as indicated in FIG. 1, the ear hook 16 of the ear-hook device 12 of the Bluetooth earphone 1 is able to rotate with respect to the first axis A1 and the second axis A2. Because the ear hook 16 can rotate with respect to the first and second axes, the user can change the relative position between the ear hook 16 and the earphone body 10 at his/her own choice, such that he/she can select to wear the Bluetooth earphone 1 on his/her left ear or right ear. For example, the Bluetooth earphone 1 of FIG. 1 is able to be worn on a user's left ear. When the user would like to wear the Bluetooth earphone 1 on his/her right ear, the ear hook 16 can be rotated with respect to the second axis A2 to position at the other side of the casing 18 first and rotated with respect to the first axis A1 next, such that the user is able to wear the Bluetooth earphone 1 on his or her right ear.

According to the Bluetooth earphone and an ear-hook device thereof disclosed in the above embodiments of the invention, the ear-hook device is able to rotate on two axes, such that a user can wear the Bluetooth earphone on his or her left ear or right ear. The Bluetooth earphone of the invention is easily assembled and operated. The user can further adjust the angle of the Bluetooth earphone worn on the ear to improve the comfort while using.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An ear-hook device for being disposed in a Bluetooth earphone, wherein the Bluetooth earphone has a casing and the casing has a through hole, the ear-hook device comprising:

- a hinge assembly rotatably disposed on the Bluetooth earphone, the hinge assembly comprising:
  - a bracket having two open slots and passing through the through hole of the casing along a first direction, wherein a shell of the casing is embedded into a track disposed on the outer surface of the bracket for enabling the bracket to rotate on the casing with respect to a first axis; and
- an ear hook rotatably disposed on the bracket of the hinge assembly, wherein the ear hook passes through the two open slots in a second direction and is able to rotate with respect to a second axis, whereby a user can selectively wear the Bluetooth earphone on his or her left ear or right ear by rotating the ear hook with respect to the second axis and rotating the bracket with respect to the first axis.

2. The ear-hook device according to claim 1, wherein the ear hook further comprises a clamping portion for coupling with the two open slots of the bracket.

3. The ear-hook device according to claim 1, wherein the bracket further comprises an opening surrounded by the outer surface of the bracket, the hinge assembly further comprising:

- a hinge cover disposed in the opening, wherein part of the ear hook is located between the bracket and the hinge cover.

4. The ear-hook device according to claim 3, wherein the hinge cover comprises a covering plate and two hooks connected to the covering plate and disposed on the inner surface of the bracket.

5. The ear-hook device according to claim 4, wherein the bracket further comprises a protrusion disposed on the inner surface of the bracket, the two hooks retain the protrusion for fixing the hinge cover on the bracket.

6. The ear-hook device according to claim 1, wherein the ear hook is a curved hook.

7. A Bluetooth earphone, comprising:

- an earphone body, having a casing having a through hole; and
- an ear-hook device, comprising:
  - a hinge assembly pivotally disposed on the earphone body, the hinge assembly comprising:
    - a bracket having two open slots and passing through the through hole of the casing along a first direction, wherein a shell of the casing is embedded into a track disposed on the outer surface of the bracket for enabling the bracket to rotate on the casing with respect to a first axis; and
  - an ear hook pivotally disposed on the bracket of the hinge assembly, wherein the ear hook passes through the two open slots in a second direction and is able to rotate with respect to a second axis whereby a user can selectively wear the earphone body earphone on his or her left ear or right ear by rotating the ear hook with respect to the second axis and rotating the bracket with respect to the first axis.

8. The Bluetooth earphone according to claim 7, wherein the ear hook further comprises a clamping portion for coupling with the two open slots of the bracket.

9. The Bluetooth earphone according to claim 7, wherein the bracket further has an opening surrounded by the outer surface of the bracket, the hinge assembly further comprising:

- a hinge cover disposed in the opening, wherein part of the ear hook is located between the bracket and the hinge cover.

10. The Bluetooth earphone according to claim 9, wherein the hinge cover comprises a covering plate and two hooks connected to the covering plate and are disposed on the inner surface of the bracket.

11. The Bluetooth earphone according to claim 10, wherein the bracket further comprises a protrusion disposed on the inner surface of the bracket, the two hooks retain the protrusion for fixing the hinge cover on the bracket.

12. The Bluetooth earphone according to claim 7, wherein the ear hook is a curved hook.

* * * * *